Nov. 14, 1961  R. G. RIEFLER  3,008,491
VALVE FOR CONCENTRIC PIPE LINES
Filed May 4, 1959  2 Sheets-Sheet 1

INVENTOR.
Roger G. Riefler

Nov. 14, 1961  R. G. RIEFLER  3,008,491
VALVE FOR CONCENTRIC PIPE LINES
Filed May 4, 1959  2 Sheets-Sheet 2

INVENTOR.
Roger G. Riefler

United States Patent Office 3,008,491
Patented Nov. 14, 1961

3,008,491
VALVE FOR CONCENTRIC PIPE LINES
Roger G. Riefler, Springfield, Mass., assignor, by mesne assignments, to The Chapman Valve Manufacturing Company, Chicago, Ill., a corporation of Illinois
Filed May 4, 1959, Ser. No. 810,707
1 Claim. (Cl. 137—625.19)

The present invention relates to new and useful improvements in structural refinements in valve apparatus and is directed more particularly to the provision of valve apparatus for controlling the flow of separate and/or different fluids in a pipe line and to an improvement in the means for accomplishing such purpose.

The invention resides in the particular arrangement, construction and relationship of the various elements of the valve apparatus as exemplified in the detailed disclosure hereinafter set forth wherein the objects of the invention as defined in the paragraphs below will be apparent.

The essential point of the invention lies in the provision of valve apparatus embodying a concentric pipe line.

The invention accordingly comprises a means for controlling the flow of different or separate fluids in a concentric pipe line or in a jacketed pipe line where fluids flow in separate streams without intermixing, and it will be helpful to an understanding of my invention to first briefly consider some of the more important features and aspects thereof, so that same may be kept in mind during the subsequent reading of the detailed description of the practical embodiments of my improvements and of the illustration thereof in the annexed drawings.

Accordingly, it is first to be noted that my invention may be embodied in any device having concentric, jacketed or other pipe lines providing for the separate flow of different fluids with means within the valve body and plug incorporated in such lines to form separated water-ways or flow paths in the open position of the plug, which water-ways or flow paths are closed off in the closed position of the plug.

It is a principal object of the present invention to provide a novel and improved construction of the type in which concentric pipe lines are employed and there is the further provision of a valve means operable with each of the separate water-ways or flow paths.

Another of the purposes hereof is to provide advantageous structural and operational features in a device of the class to which reference has been made leading to its simplicity in construction, its adaptability to economical manufacture and its efficiency and dependability in operational use, and providing important distinct advantages in durability, efficiency, ease of operation and the like.

Another object hereof is to provide a device having the following inherent meritorious characteristics; first, the securement of a higher degree of accuracy and greater degree of variety in the manner of work performed therewith than has heretofore been possible with prior devices known in the art; second, the attainment of an improved apparatus wherein the components are coordinated for facile assembly and wherein the resultant structure is capable of more dependable operation than devices heretofore known; third, the attainment of a more economical and higher speed of construction and assembly of the device due to its simplification of design and its unique composition of coacting parts; fourth, the attainment of a flexibility or a capability of adjustment by which a large variety of work can be produced by means of the same device; fifth, the achiement of a greater ease in repairs than has been possible in related devices heretofore known; sixth, the provision of a construction which may be readily installed with respect to the various purposes for which it is intended, and seventh, the provision of such other improvements in and relating to valve apparatus of the type above referred to as are hereinafter described and claimed.

The present device contains many specific improvements in construction and association of the various elements which themselves are a minimum in number, with a resulting decreased cost of manufacture and increased facility of use, it being an object hereof to provide a construction in which the number of operating parts is greatly reduced and which is simple and compact in accordance with the demands and desires of manufacturers and purchasers alike and which is not only distinctive in its appearance and practical in its value but also reliable in its operation and efficient in its use.

Convenience of arrangement of parts, extreme compactness conducive toward the provision of an apparatus of small proportions, and ruggedness and durability are further desirable features that have been borne in mind in the production and deveolpment of the present invention.

Herein I provide valve apparatus for controlling the flow of different or separate fluids in a concentric pipe line or in a jacketed pipe line, i.e. a pipe line where fluids flow in separated streams without intermixing.

According to present practice, where concentric or jacketed or other pipe lines are employed for the separate flow of different fluids, separate valves are used for each flow path.

According to the novel features of this invention, valve apparatus is provided which is constructed and arranged to control the flow of separate fluids, whether in a concentric or in a jacketed pipe line.

The novel features of the invention are accomplished by the provision, in a valve body and plug, of means which provide in combination with seating means separated water-ways or flow paths in the open position of the plug, whereas in the closed position of the plug, each flow path of the pipe line is entirely closed off.

The novel features of the invention, for purposes of disclosure, will be described in connection with valves of the type shown in the U.S. Patents to Larner, No. 1,236,778, and to Goldberg, No. 2,169,525. Such valves are commonly known as cone valves wherein the valve closing component or plug has tapering sides and is generally in the form of a frustum of a cone commonly called a cone plug.

Other objects and advantages of the present invention will be in part obvious or in part pointed out more fully hereinafter. All will become apparent as the detailed description of the exemplary forms of the invention proceeds below; it being understood that the invention consists substantially in the combination, construction, location and relative arrangement of parts, all as described in detail hereinafter as shown in the accompanying drawings, and with particularity in the appended claims forming a part hereof.

To the accomplishment of these ends, the invention intended to be protected by Letters Patent will be understood to comprise the features set forth in this description and annexed drawings illustrating in detail certain physical embodiments of the invention and showing parts combined and arranged in accordance with modes which I have devised for the practical application of the principles hereof.

It will be understood however that this is only indicative of but one of the various ways in which the principles of the invention may be employed and in which the component parts may be combined and arranged. It is not intended to be exhaustive of nor limiting of nor departing from the spirit of the invention. That is, the precise construction of the figures of the drawing need not be slavishly followed as, of course, the valve apparatus may have to be modified in accordance with the use to which it is to be put. Changes, modifications and alterations are contemplated and may be made and resort had to substitutions within the spirit and scope of the claims hereof. No limitations, therefore, are to be implied from the following specific description. Same is merely given with a view to illustrating and explaining the principles of the invention and their embodiment for practical use, in order that others skilled in the art may be enabled to adapt and modify them in numerous embodiments, variations and modifications, each as may be best adapted to the conditions of any particular use.

That is to say, the objects of the invention may be attained by use of constructions different in certain respects from that disclosed such as in size, form, proportion and the like, all without departing from the underlying principles and scope of the invention and it is understood that such will readily occur to those skilled in the art. The invention is susceptible of same, without departing from the real spirit or scope hereof. Such adaptations and/or changes should be and are intended to be comprehended within the meaning range of equivalence of the claim appended below.

In the accompanying drawings forming part of this specification and which illustrate, by way of example, the principle of the invention and the best modes, which have been contemplated, of applying that principle by way of constructions in accordance therewith, wherein like characteristics of references or numerals are employed to designate like or corresponding parts throughout the several views.

Figures 1, 2, 3:
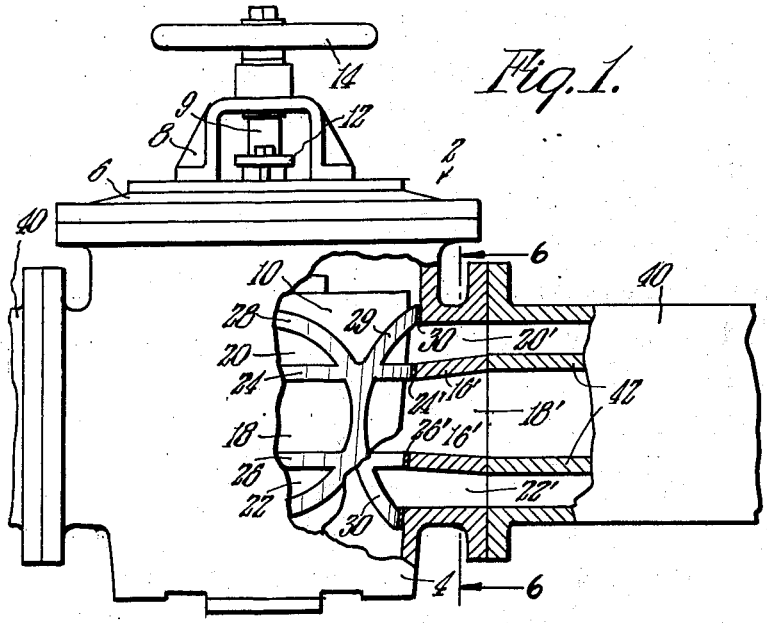
FIG. 1 is a small scale side elevational view of valve apparatus embodying the novel features of the invention with portions broken away for purposes of clarity.
FIGS. 2 and 3 are elevational views, more or less diagrammatic, of valve plugs showing different form of the invention.

In the following description and claims, various details will be identified by specific names for convenience. These names however are intended to be as generic in their application as the art will permit.

Referring now to the drawing forming a part of this specification more in detail, and referring more particularly to the preferred form of my invention selected for illustrative purposes, I have shown a valve in order that the general relation and utility of the valve apparatus may be better understood.

Incidentally, it will be understood that, throughout this disclosure, reference to water-ways means passageways or flow paths for fluids through the valve body, its plug, and pipe line.

The valve 2 of the invention, as is usual, includes a body 4 having a cap 6 which is secured to the upper side thereof and has a yoke 8 secured to said cap and extending upwardly therefrom.

A plug 10 is rotatable in the body by means of a stem or spindle 9 which is rotatable in a stuffing box 12 of the cap and in the yoke and has an operating hand wheel 14 secured thereto.

The plug 10 is mounted for rotation between its closed and open positions, as in the patents previously referred to, and may be operated by any of the well known mechanisms commonly employed in connection with cone valves.

Figure 4:
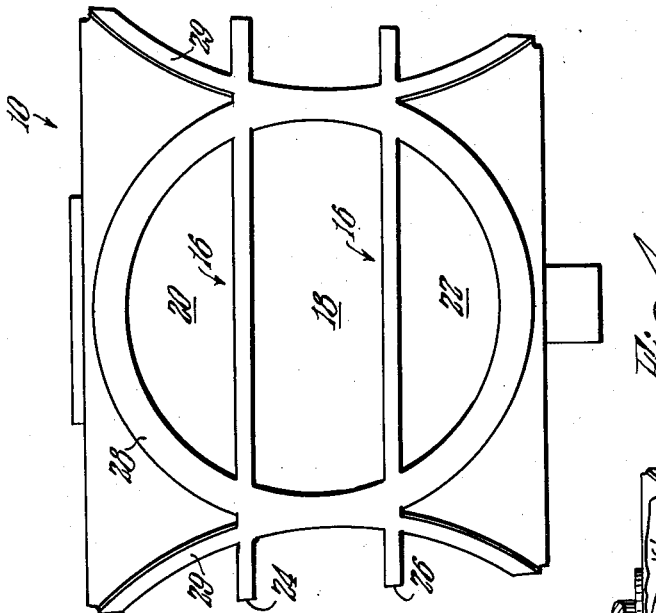
FIG. 4 is an elevational view of the plug of the valve shown in FIG. 1.
Figure 6:
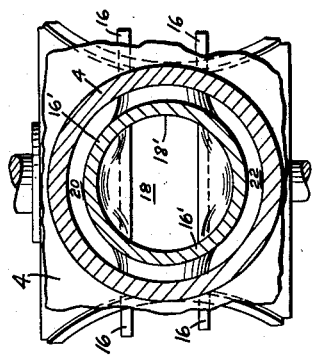
FIG. 6 is a fragmentary sectional view taken on the line 6—6 of FIG. 1, with certain portions of the valve body having been broken away for purposes of clarity.
Figure 5:
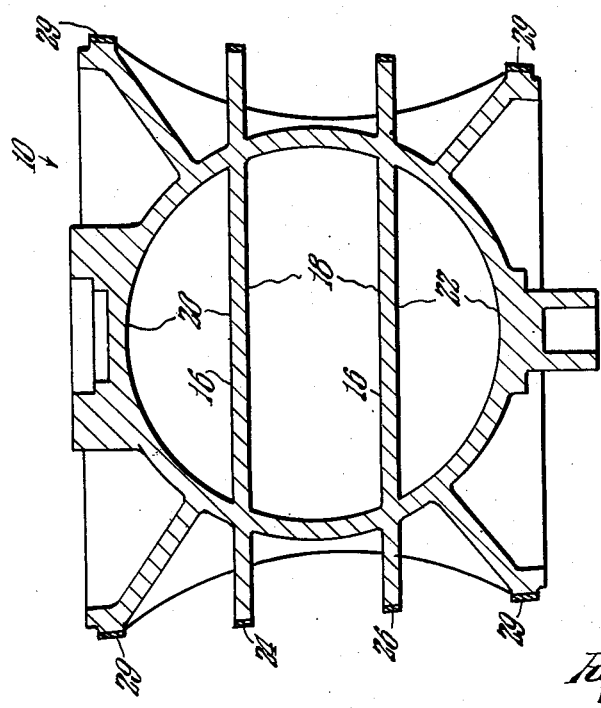
FIG. 5 is a sectional elevational view through the plug shown in FIG. 4.

The plug 10 of the valve, best shown in FIGS. 4 and 5, is cylindrical with tapering sides, and is commonly called a cone plug and is used in connection with what is known as a cone valve.

Said plug 10, assuming that it is to be rotatable on a vertical axis, has vertically spaced horizontal partitions or divisions 16 to provide separate water-ways 18, 20 and 22 thereacross. Said partitions extend across what would be the water-way of an ordinary plug.

The partitions 16 are, in diameters equal to the diameters of the plug in the planes of said partitions, and are provided with sealing means 24 and 26 on the peripheries thereof.

Sealing means such as 28 are provided on opposite sides of the plug around the water-ways to engage sealing means 30 provided in the body of the valve, in the open position of the plug. In FIG. 1, the plug is shown in its closed position.

Also, said plug is provided with sealing means 29 at right angles to the seating means 28 for engaging the seating means of the valve body in the closed position of the plug.

The body, of course, will be provided with seating means 30 at opposite ends, or at opposite sides, of the plug which are complemental to the plug seats 28 or 29 for seating engagement thereby, in the closed, as well as the open, position of the plug.

The body 4, at its opposite end portions is provided with partitions 16' and 16' which extend inwardly from its ends and these are provided with seating means 24' and 26' which are complemental to the seating means 24 and 26 of the partitions 16 of the plug. In all positions of the plug, the partitions of the plug and of the body are in seating engagement. That is, the body is provided with seating means 24' and 26' on inner ends of partitions 16' which extend circularly around and between said partitions for seating engagement by the seating means 24 and 26 of said plug in all positions of said plug.

Sections of a pipe line are represented by 40 which are secured to the opposite ends of the body which are provided with partitions 42 to provide water-ways in communication with the water-ways of the body.

Thus, in open position of the valve plug, separate streams of fluid of the pipe line flow as separate streams through the valve body and plug without intermixing.

In closed position of the plug, the said plug closes off all of the water-ways in the body.

In some cases, it may be desired to close one water-way and to open others, and such may be accomplished as illustrated in FIG. 3. A plug 110 has partitions 116 to provide water-ways 118, 120 and 122. The flow in the water-ways 120 and 122 is in the direction of arrows $a$ while the flow in the water-way 118 is at right angles thereto. This arrangement is distinguished from that of plug 10 in FIG. 2, where the flow through all of the water-ways is in the direction of arrows $b$.

The seating and sealing means may take various forms, such as rings which may be secured to the plug and in the body in any one of the ways common in the valve industry. Said means may be formed from such material as may be desired for the particular fluid or fluids to flow through the valve.

As will be observed, the body and plug are provided with means, such as partitions or divisions, to form separated water-ways in said body and plug. Said water-ways are arranged so that, in open position of the plug, the water-ways thereof are in register with their respective water-ways of the body for the flow of separate fluids through the valve without intermixing.

To insure adequate sealing and to prevent mixing of fluids in the separated water-ways, the said partitions have diameters equal to the diameters of the plug in the planes of said partitions, and the peripheries of said partitions are provided with sealing means cooperating with complemental sealing means of the body to facilitate adequate sealing and to obviate mixing of fluids in the separated water-ways.

The valve body and plug may be provided with any desired number of cooperating separated water-ways to which may be connected the flow paths of a concentric pipe line or of a jacketed pipe line whereby a plurality of flow streams may be controlled by a single valve.

Although my invention has been described and illustrated herein with particular reference to a cone valve, it should be appreciated that its utility and application extend beyond the particular type of valve illustrated and its broad scope and concept comprehend the useful and novel features set forth when combined with valves generally and thus, with respect to the scope of the invention, the foregoing material is to be considered as illustrative rather than limiting.

It is to be further understood that the phraseology or terminology employed herein is for the purpose of description and not of limitation. Although specific terms are employed, they are used in a generic and descriptive sense only and not for purposes of limitation.

Without further analysis, the foregoing is intended to so fully reveal the gist of my invention and the construction and operation of the device thereof that others can, by applying current knowledge, readily adapt it for various applications without omitting features which, from the standpoint of prior art, fairly constitute essential characteristics of the generic or specific aspects of this invention. The substitution of equivalents and other modifications are contemplated, as circumstances may suggest or render expedient, since the invention is susceptible of various changes and modifications without departing from the real spirit or underlying principles of the invention. In other words, it is not desired to limit the invention to the exact construction shown and described as the objects of the invention may be attained by the use of constructions different in certain respects from that disclosed.

The following claim is desired to include within the scope of the invention all such suitable variations, modifications and equivalents by which substantially the results of the invention may be obtained through the use of substantially the same or equivalent devices or means.

Accordingly, limitation of this invention should be made only as determined by a proper interpretation of the terms used in the subjoined claim.

It is intended to claim the invention, broadly as well as specifically, as indicated by the appended claim.

What is claimed as new and useful is:

Valve apparatus for controlling separate fluid flows in pipe line comprising, a valve body having opposite inlet and outlet ends, a conical plug having relatively converging sides rotatable on a vertical axis in said body between closed and open positions, means to rotate said plug, said plug having an opening extending horizontally therethrough, vertically-spaced horizontally-disposed partitions through the opening of said plug forming separate waterways, the peripheries of said partitions extending to lines representing the sides of said plug, said body provided in the inlet and outlet ends thereof with vertically spaced partitions having adjacent inner ends complemental to the peripheries of the partitions of said plug whereby separate water-ways are formed for communicating with the water-ways of said plug in open position thereof, said partitions of said body defining a central flow passage circular in cross-section adjacent the juncture of said flow passage with a central pipe passage of said pipe line and widening to assume a substantially rectangular cross section adjacent said partitions of said plug, said partitions of said body further defining an outer flow passage, said outer flow passage being an annulus adjacent its juncture with an outer annular pipe passage of said pipe line and being divided by said widening central flow passage into two portions separate from each other and communicating with certain of the waterways of said plug, means for sealing said water-ways in open position of said plug, and means for sealing said plug and body in closed and open positions of said plug.

References Cited in the file of this patent

UNITED STATES PATENTS

| | | |
|---|---|---|
| 810,877 | McKeown | Jan. 23, 1906 |
| 886,013 | Paul | Apr. 28, 1908 |
| 1,282,650 | Studdard | Oct. 22, 1918 |
| 1,623,248 | Joseph et al. | Apr. 5, 1927 |
| 2,301,428 | MacNeil | Nov. 10, 1942 |
| 2,630,325 | Reynolds | Mar. 3, 1953 |